United States Patent
Capewell

(10) Patent No.: US 6,631,797 B2
(45) Date of Patent: Oct. 14, 2003

(54) NO-BACK DEVICE

(75) Inventor: Terence John Capewell, Wheaton Aston (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 10/087,669

(22) Filed: Mar. 2, 2001

(65) Prior Publication Data

US 2002/0121421 A1 Sep. 5, 2002

(30) Foreign Application Priority Data

Mar. 2, 2001 (GB) ............................... 0105270

(51) Int. Cl.$^7$ ............................... F16D 25/20
(52) U.S. Cl. ............... 192/223; 192/113.34; 74/424.71; 184/5
(58) Field of Search ............... 192/223, 113.34, 192/113.36, 113.3, 46; 184/5; 74/424.71, 424.6, 424.7, 425

(56) References Cited

U.S. PATENT DOCUMENTS

| 3,583,248 A | * | 6/1971 | Langenberg | ............... | 74/89.39 |
| 4,697,672 A | * | 10/1987 | Linton | ............... | 188/134 |
| 5,551,917 A | | 9/1996 | Wood | | |
| 5,732,804 A | * | 3/1998 | Wienholt | ............... | 192/113.3 |
| 6,047,806 A | * | 4/2000 | Sasse | ............... | 192/113.36 |
| 6,109,415 A | * | 8/2000 | Morgan et al. | ............... | 192/223.1 |

FOREIGN PATENT DOCUMENTS

| EP | 0 669 219 | | 8/1995 |
| EP | 0 960 811 | | 12/1999 |
| GB | 1 309 645 | | 3/1973 |
| GB | 1309645 | * | 3/1973 |

* cited by examiner

Primary Examiner—Saul Rodriguez
(74) Attorney, Agent, or Firm—Andrus, Sceales, Starke & Sawall

(57) ABSTRACT

A no-back device for an actuator having a screw shaft extending along an axis and a brake element fixed for rotation with the shaft and extending laterally of the axis, the no-back device comprising a rotary ratchet member and a rotary friction member mounted for limited axial movement within a recess defined by a housing, and defining at least one path for passing fluid through the recess, the no-back device further comprising peripherally extending diversion means disposed between an outer periphery of the friction member and an inwardly facing peripheral surface of the housing whereby, in use, fluid passing through the recess is diverted away from the inwardly facing peripheral surface of the housing and across a laterally extending surface of the friction member.

9 Claims, 2 Drawing Sheets

NO-BACK DEVICE

The invention relates to a braking device primarily for a linear, screw actuator, the device being of the kind known as a "no-back" device.

The principle of operation of so-called "no-back" braking devices is known in the art in connection with actuators for positioning a flight control surface on an aircraft. The operation of one type of no-back device is described, for example, in U.S. Pat. No. 3,583,248, the disclosure of which is incorporated herein by reference. The role of such a no-back device is to facilitate elimination of the effect of any forces tending to aid or oppose input torque applied to a screw of an actuator, with a view to substantially preventing such forces back-driving the screw shaft and thus the prime mover driving the shaft. It is recognised that there will be operative conditions in which the no-back device of an actuator is operative while drive is being transmitted to the shaft from the associated prime mover and in such situations the no-back device can be subjected to loadings giving rise to high wear rates. It is an object of the present invention to provide a no-back device which is more tolerant of such high wear rate operating conditions.

In accordance with the invention, there is provided a no-back device for an actuator having a screw shaft extending along an axis and a brake element fixed for rotation with the shaft and extending laterally of the axis, the no-back device comprising a rotary ratchet member and a rotary friction member mounted for limited axial movement within a recess defined by a housing, the no-back device defining at least one path for passing fluid through the recess, the no-back device further comprising peripherally extending diversion means disposed between an outer periphery of the friction member and an inwardly facing peripheral surface of the housing whereby, in use, fluid passing through the recess is diverted away from the inwardly facing peripheral surface of the housing and across a laterally extending surface of the friction member.

In this manner, flow of fluid over critical friction surfaces can be controlled and promoted, thereby facilitating effective cooling and/or lubrication of the device, in use.

The diversion means may be a seal.

Preferably, the no-back device includes a passage for fluid communication between said laterally extending surface of the friction member and a further laterally extending surface of the friction member on an opposite side of the friction member.

The passage may be a through hole in the friction member.

The first-mentioned laterally extending surface of the friction member may include a laterally extending channel for channelling fluid across said first-mentioned surface.

Said further laterally extending surface of the friction member may include a respective further laterally extending channel for channelling fluid across said further surface.

The first-mentioned channel and said further channel may be interconnected for fluid communication by said passage.

Preferably, the no-back device is adapted to receive, in use, the brake element of the screw shaft within said recess such that the brake element is disposed axially adjacent the friction member, thereby promoting dispersal of fluid passing across one of said laterally extending surfaces of the friction member over that surface.

In order that the invention may be well understood, an embodiment thereof will now be described, by way of example only, with reference to the accompanying drawings, in which.

Figure 1:
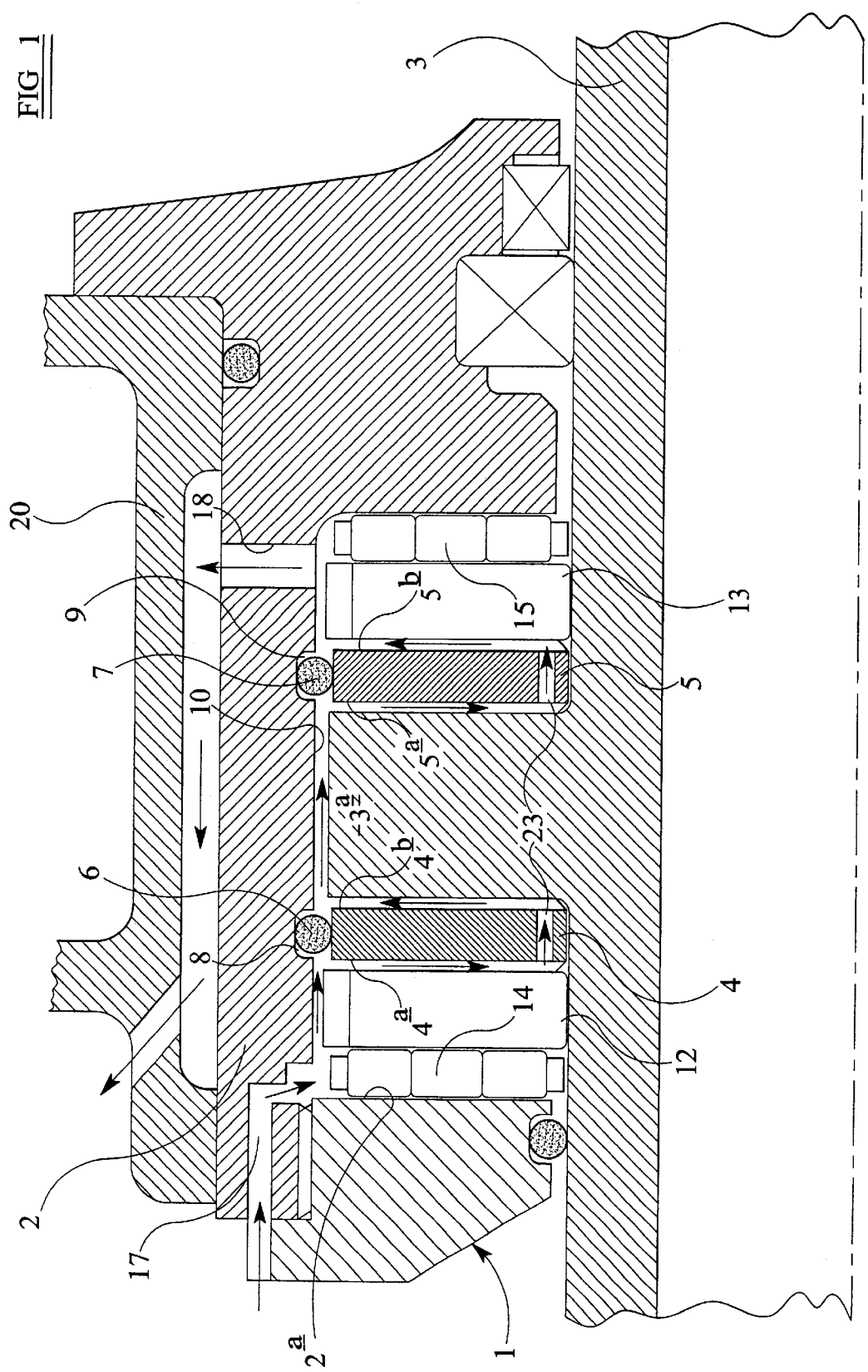
FIG. 1 is a schematic cross-sectional side view of a no-back device cooperating with a screw shaft of an actuator.

Referring to the drawings, a no-back device 1 is mounted in cooperation with a screw shaft 3 of a linear screw actuator for positioning a flight control surface (not shown) on an aircraft. A housing 2 of the no-back device 1 defines a recess 2a. The shaft 3 is integral with a brake element in the form of a radially extending flange 3a which extends within the recess 2a. Rotary friction members in the form of annular carbon discs 4, 5 are mounted about the shaft 3, which may rotate relative thereto. The discs 4 and 5 are respectively disposed on opposite axial sides of the radially extending portion 3a.

Peripherally extending diversion means in the form of annular ring seals 6 and 7 are respectively disposed between respective outer peripheries of the friction discs 4 and 5 and respective inwardly facing surfaces of circumferential grooves 8 and 9 formed in an inner peripheral surface 10 of the housing 2. Respective annular ratchet members 12 and 13 are disposed about the screw shaft axially outwardly of the friction discs 4, 5 on opposite sides of the brake element 3a. Respective thrust bearings 14, 15 extend peripherally about the shaft 3 and are disposed between respective opposite inwardly facing end surfaces of the housing and respective axially outwardly facing surfaces of the ratchet members 12,13.

Cooling and lubricating fluid in the form of oil is supplied through an inlet passageway 17 of the housing from a pump, in use, and exits the no-back device 1 through an outlet passageway 18 in the housing 2, from where it enters an associated gearbox housing 20. It will be appreciated that oil from the inlet enters the housing recess 2a at a location radially distal the shaft 3 and proceeds, as shown by thick dark arrows in FIG. 1, along a path provided by a generally annular space between the inner peripheral surface 10 of the recess 2a and the respective radially outer peripheries of the thrust bearing 14 and the ratchet member 12. Thereafter, the flow of oil is diverted by seal 6 through an annular space between the ratchet member 12 and the friction disc 4 in a direction radially inwardly of the shaft 3.

Figure 2:
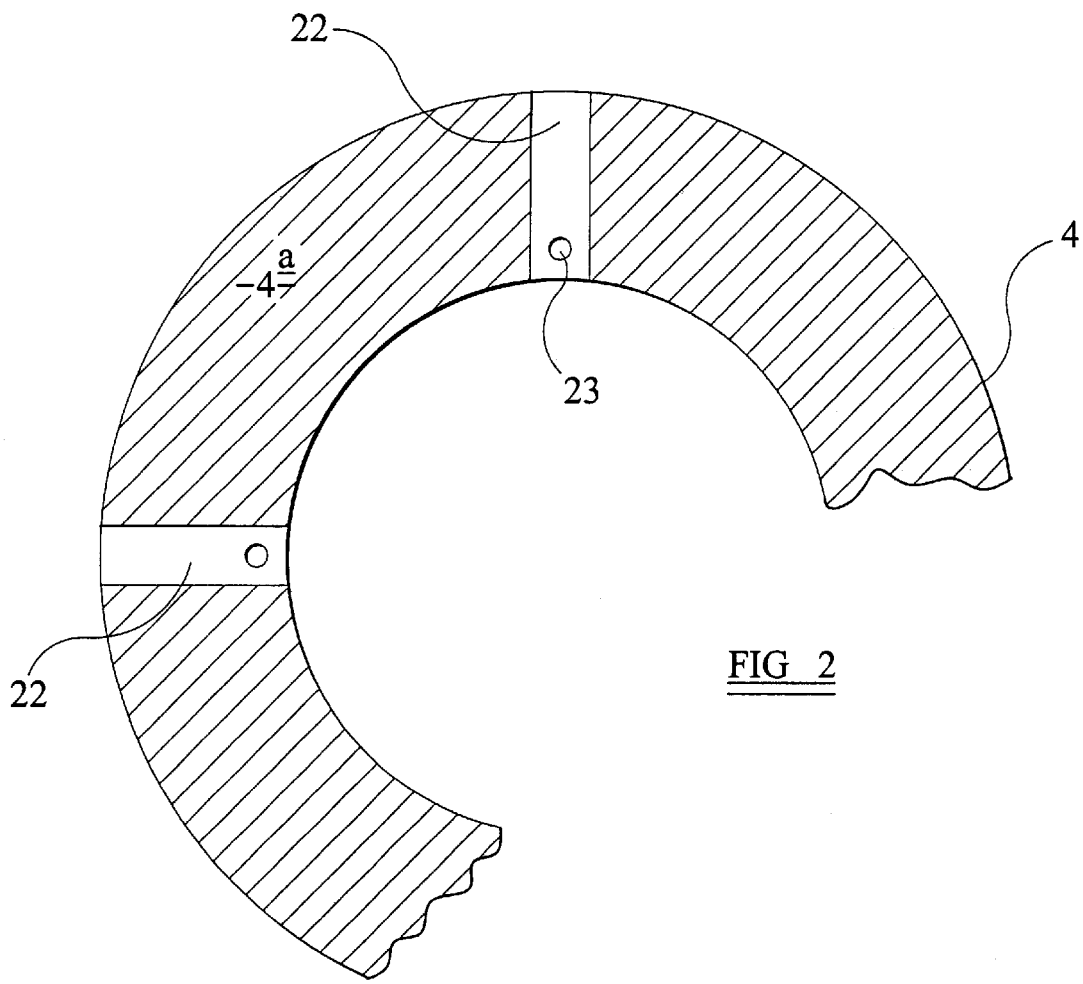
FIG. 2 is an end view of a portion of a friction member of the device.

As best seen in FIG. 2, circumferentially spaced radial grooves 22 are provided on a radially extending friction surface 4a of the friction disc 4. Whilst four grooves 22 are indicated in FIG. 2, any convenient number of grooves may be provided according to requirements. The grooves 22 direct oil across the surface 4a of the friction disc 4, the oil tending to spread across substantially the entire surface 4a during rotation of the disc 4 in use.

Figure 3:
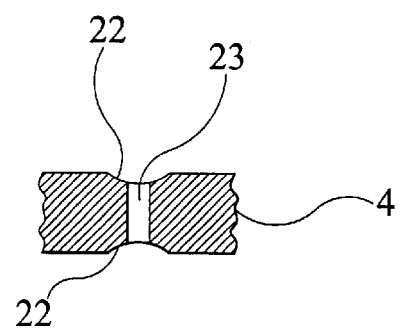
FIG. 3 is a cross sectional view of the friction member of FIG. 2.

As best seen in FIGS. 2 and 3, a through hole 23 is provided corresponding to each of the radial grooves 22. The through holes 23 allow the passage of oil to an opposite friction surface 4b of the friction disc 4. As seen in FIG. 1 the oil is constrained to flow radially outwardly between the brake element 3a and the opposite friction disc surface 4b before continuing along a path defined between the inner peripheral surface 10 of the recess 2a and the outer periphery of the brake element 3a.

The oil is then diverted by seal 7 radically inwardly across a friction surface 5a of friction disc 5, through a further through-hole 23 in the disc 5 and across an opposite friction surface 5b of friction disc 5 before exiting the housing through outlet 18. It will be appreciated that friction disc 5 is assisted in directing oil across its opposite radially extending friction surfaces 5a, 5b by radial grooves and through holes corresponding to the grooves 22 and the holes 23 described with respect to friction disc 4.

During operation of the no-back device, which operates according to known principles which will not be described here in detail, friction is generated between the friction surfaces 4a, 4b, 5a, 5b of the friction discs 4 and 5 as they rub against associated surfaces of the ratchet members 12, 13 or the brake element 3a. Diversion by the oil seals 6, 7 of the oil flow across the critical heat producing surfaces of the device 1 provides a relatively cheap and effective means of facilitating cooling and lubrication of the critical surfaces.

Using the device described above with reference to the drawings, it will be apparent that fluid can be driven across opposite surfaces of each of the friction members through relatively small axial spacings between the friction members and respective next-adjacent parts of the device, facilitating effective cooling and lubrication of the device.

What is claimed is:

1. A no-back device for an actuator having a screw shaft extending along an axis and a brake element fixed for rotation with the shaft and extending laterally of the axis, the no-back device comprising a rotary uni-directional clutch and a rotary friction member mounted for limited axial movement within a recess defined by a housing, and defining at least one path for passing fluid through the recess, the no-back device further comprising peripherally extending diversion means disposed between an outer periphery of the friction member and an inwardly facing peripheral surface of the housing whereby, in use, fluid passing through the recess is diverted away from the inwardly facing peripheral surface of the housing and across a laterally extending surface of the friction member.

2. A no-back device as claimed in claim 1 wherein said diversion means is a seal engaging the periphery of the friction member and the housing.

3. A no-back device as claimed in claim 1 further including a passage for fluid communication between said laterally extending surface of the friction member and a further laterally extending surface of the friction member on an opposite side of the friction member.

4. A no-back device as claimed in claim 3 wherein said passage is a through hole in the friction member.

5. A no-back device as claimed in claim 3 wherein said first-mentioned laterally extending surface of the friction member includes a laterally extending channel for channelling fluid across said first-mentioned surface.

6. A no-back device as claimed in claim 5 wherein said further laterally extending surface of the friction member includes a respective further laterally extending channel for channelling fluid across said further surface.

7. A no-back device as claimed in claim 6 wherein said first-mentioned channel and said further channel are interconnected for fluid communication by said passage.

8. A no-back device as claimed in claim 1 wherein said brake element of the screw shaft is received within said recess such that the brake element is disposed axially adjacent the friction member, thereby promoting dispersal of fluid passing across one of said laterally extending surfaces of the friction member over that surface.

9. A no-back device as claimed in claim 1 characterised in that a respective friction member and an associated ratchet member are disposed on either side of said brake member.

* * * * *

UNITED STATES PATENT AND TRADEMARK OFFICE
CERTIFICATE OF CORRECTION

PATENT NO.     : 6,631,797 B2
DATED          : October 14, 2003
INVENTOR(S)    : Terence John Capewell It is certified that error appears in the above-identified patent and that said Letters Patent is hereby corrected as shown below:

<u>Title page,</u>
Item [22], change the filing date to -- March 2, 2002 --

Signed and Sealed this

Ninth Day of March, 2004

JON W. DUDAS
*Acting Director of the United States Patent and Trademark Office*